March 21, 1967 J. H. BURKHALTER 3,310,753

SEQUENTIALLY FIRING ARRAY OF LASER UNITS

Filed Feb. 7, 1963 10 Sheets-Sheet 1

INVENTOR.
JAMES H. BURKHALTER
BY Julian C. Renfro
ATTORNEY

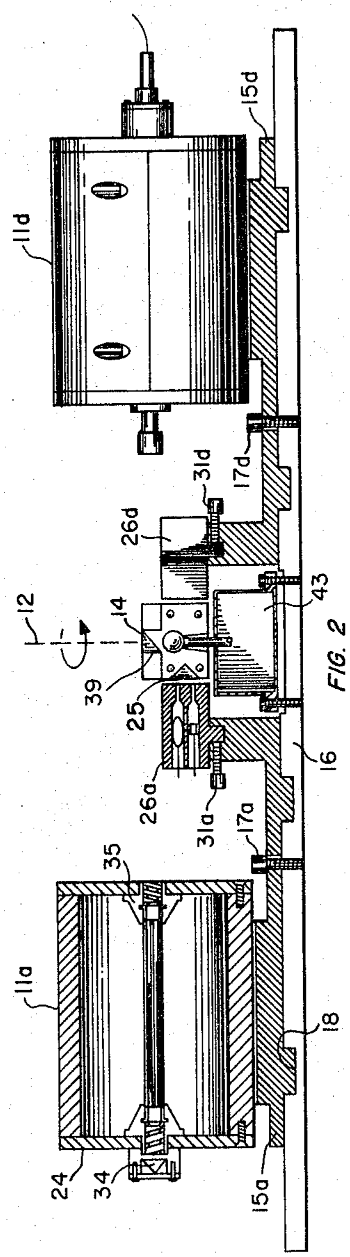
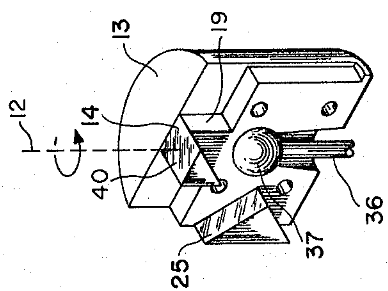
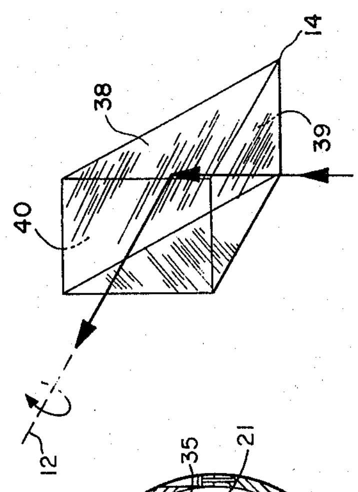
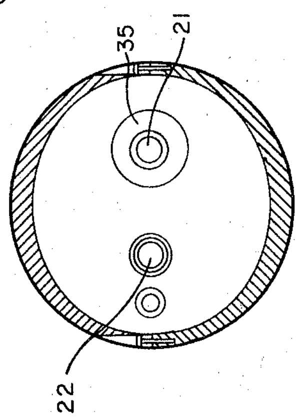
INVENTOR.
JAMES H. BURKHALTER
BY Julian C. Renfro
ATTORNEY

SEQUENTIALLY FIRING ARRAY OF LASER UNITS

Filed Feb. 7, 1963 10 Sheets-Sheet 3

INVENTOR.
JAMES H. BURKHALTER
BY
Julian C. Renfro
ATTORNEY

SEQUENTIALLY FIRING ARRAY OF LASER UNITS

Filed Feb. 7, 1963 10 Sheets-Sheet 4

INVENTOR.
JAMES H. BURKHALTER
BY
Julian C. Renfro
ATTORNEY

INVENTOR.
JAMES H. BURKHALTER
BY Julian C. Renfro
ATTORNEY

SEQUENTIALLY FIRING ARRAY OF LASER UNITS

Filed Feb. 7, 1963 10 Sheets-Sheet 6

INVENTOR.
JAMES H. BURKHALTER
BY Julian C. Renfro
ATTORNEY

SEQUENTIALLY FIRING ARRAY OF LASER UNITS

Filed Feb. 7, 1963 10 Sheets-Sheet 7

INVENTOR.
JAMES H. BURKHALTER
BY Julian C. Renfro
ATTORNEY

SEQUENTIALLY FIRING ARRAY OF LASER UNITS

Filed Feb. 7, 1963 10 Sheets-Sheet 8

INVENTOR.
JAMES H. BURKHALTER
BY
Julian C. Renfro
ATTORNEY

SEQUENTIALLY FIRING ARRAY OF LASER UNITS

Filed Feb. 7, 1963 10 Sheets-Sheet 9

INVENTOR.
JAMES H. BURKHALTER
BY Julian C. Renfro
ATTORNEY

SEQUENTIALLY FIRING ARRAY OF LASER UNITS

INVENTOR.
JAMES H. BURKHALTER
BY Julian G. Renfro
ATTORNEY

United States Patent Office 3,310,753

Patented Mar. 21, 1967

3,310,753
SEQUENTIALLY FIRING ARRAY OF LASER UNITS

James H. Burkhalter, Orlando, Fla., assignor to Martin-Marietta Corporation, Middle River, Md.

Filed Feb. 7, 1963, Ser. No. 256,913
15 Claims. (Cl. 331—94.5)

This invention relates to the field of optical masers, otherwise known as lasers, and more particularly to a concept for achieving laser output at a high pulse repetition frequency utilizing a plurality of laser units, while at the same time assuring that the external optical paths of the individual output beams of the laser array will be substantially identical. Furthermore, the present invention enables the selection of an arbitrary sequence for firing the individual lasers, as well as providing an adjustable interavl between firings of such lasers.

Masers belong to the new and rapidly growing family of quantum electric devices which make use of intrinsic energy oscillations within the structure of particles of matter, instead of utilizing free electrons as conventional vacuum tubes do. The name maser was originally intended as an acronym of Microwave Amplification by Simulated Emission of Radiation.

According to popular theory, the atoms of which all matter is constructed have nucleii at their center and electrons revolving in orbits about these nucleii. The electrons also rotate or spin on their own axes. Atoms are capable of existing for brief periods of time at any of a number of energy levels. They absorb radiation in order to rise to a higher energy level, and emit radiation when dropping to a lower energy level. In either case, radiation is in the form of photons, which may be described as quanta of energy. It is basic to devices of the type here being discussed that both the absorption and emission of energy can be induced by a photon of an electromagnetic wave of the proper frequency.

Each element has characteristic energy levels and characteristic resonant frequencies, and inasmuch as the frequency required to induce energy jumps from one level to the other is critical, an irridating wave striking an atom must be of a frequency which represents the precise difference between a pair of energy levels that a given atom is capable of assuming and between which levels transitions are possible. Such a wave will carry photons whose energy is also equal to this difference in energy levels.

The quantum energy jumps within the particles of matter are jumps of electrons within individual atoms rather than energy transitions of whole molecules. Instead of the electrons being paired off and cancelling out each other's magnetism as would be the case in most substances, in some materials such as the ruby, the atoms possess electrons which are unpaired, so the cancellation is incomplete. In such cases the material as a whole is magnetic, and it is the behaviour of the unpaired electrons placed in a magnetic field that makes the solid state maser possible.

The essential function of a maser is that of achieving the desired emission of radiation from the atoms or molecules in a quantity of matter contained in the active element of the maser, which active element may be regarded as constituting the vital portion of the device. In a solid state maser, the active element is in the form of a crystal lattice to which an impurity has been added in what is known as a doping process. This impurity is a material which usually has more than one unpaired electron, and it is the ions of this material which provide the maser action. Normally, the crystal itself merely acts as a host in which energy oscillations can take place.

If the output of the maser is in the infrared or optical part of the spectrum, the term laser is customarily substituted for maser. The acronym in this case is Light Amplification by Simulated Emission of Radiation. The active material can be of the solid state type, such as ruby, or neodymium doped calcium tungstate, or alternatively, the active element may for example be a gas such as a mixture of helium and neon. The radiation which emerges from lasers is a coherent wave of great purity, which is highly stable in frequency and virtually free of noise. As long as a sufficient supply of high energy particles can be maintained in the active material, the action will continue and radiation is emitted.

The laser is probably the development in the quantum electronics field with the most far-reaching potential, and was first predicted by Schawlow and Townes in a 1958 paper published in Physical Review, volume 112, Number 6, entitled, "Infrared and Optical Masers." In 1960, less than two years later, Maiman succeeded in operating a pulsed ruby laser, whereas Javan announced a helium-neon gas laser in January 1961. Lasers operate on substantially the same physical principles as those already described for masers, except that the energy levels involved in lasers are separated by larger quantities, leading to transitions with wavelengths in the optical or near optical ranges. The active element may for example be a ruby rod that is less than an inch in diameter and several inches long, with the ends of such a rod being finely polished so as to be exceedingly flat and parallel to each other, which ends may be dielectrically coated, or coated with silver thus to form a device capable of achieving optical resonance known as a Fabry-Perot Interferometer. The coating on at least one end of the rod is slightly transmissive or else has a small transparent "hole" in the center so that in either case there will be an "escape port" for emitted light. Alternatively, external Fabry-Perot plates may be used in place of the coated ends. When reflectors external to the active element are used, the ends of the active element are preferably anti-reflection coated.

The use of a so-called roof top reflector instead of one or both of the Fabry-Perot plates simplifies the alignment of the optical elements involved by virtue of the self-aligning feature of the roof top geometry. The roof top may be either in an external prism or be formed by surfaces of the laser material. Other alternate geometries which may be feasible include cyclic systems in which the light is continually reflected in a cyclic path, so as to traverse the laser material repeatedly.

As to details of the active element of the laser, in order for a material to be a satisfactory laser material, it must be capable of having so-called population inversion. The ordinary equilibrium distribution of populations of energy levels in a given species of atoms is one in which successively higher energy levels have successively decreasing populations in an exponentially decreasing fashion that is in accordance with the well-known Boltzmann distribution. A population inversion is a condition in which for a given pair of energy levels, the higher level has a higher population. Naturally, this is not an equilibrium situation inasmuch as it is not in accord with the Boltzmann distribution.

Another property that a satisfactory laser material must possess is the existence of a metastable state. A state is designated metastable if all transitions to lower levels are first order forbidden. That is, the state will have a lifetime of spontaneous decay much longer than that for a normal state. It is therefore possible to store populations of atoms in an excited state if that state is metastable.

The active element must also possess desirable mechanical and thermodynamic properties. Because the active laser material has two or more atomic states, having an energy separation corresponding to the desired operating frequency or wavelength of the material, it is possible to pump the atoms from the ground state and overpopulate the upper energy level. Ruby has three states, and it may be excited, or "pumped" with white or green light from a flash lamp for example, to a higher energy level, from which it falls by a non-radiative transition to the energy level involved in laser action, i.e. the $^2E$ level. If a xenon tube for example is employed, blue green photons cause the chromium ions in the ruby to assume the $^2E$ level. There will be some spontaneous emission from the metastable level, whereas other ions remain at this energy level until induced to emit as a result of the radiation field set up by the spontaneous emission. In practice, the pulse of pumping light is made as short as possible consistent with the energy requirements and circuit limitations, and normally the duration of pumping is of the order of a millisecond.

During this time a succession of processes take place. The populated energy levels of the active atoms are raised or pumped from the ground state to an excited metastable state, usually by some circuitous route, and there allowed to accumulate. Finally, a population level is reached where there are more atoms in the upper state of a possible transition than in the lower state, i.e., a population inversion is achieved. Stimulated emission can now exceed absorption for this transition frequency, and amplification at the transition frequency is possible. If the material is in a system which is optically resonant to this frequency, such as a Fabry-Perot etalon, the system may oscillate, or in other words, lasing action may take place.

As a result of this arrangement, competition will exist between the pumping source trying to increase the population inversion on the one hand, and lasing action trying to decrease it on the other. Thus the population inversion is limited by the lasing action itself and this limitation restricts the power level of the oscillation. It is this limitation that demands a solution and simultaneousy suggests one, which is the process known as Q-switching.

Q-switching is a process in which the resonance of the Fabry-Perot cavity is controlled in such a manner that the above-mentioned competition is largely eliminated. In accordance with such process, the system is made nonresonant (low Q) during the pumping period when the population inversion is increasing, thus enabling the degree of population inversion to be increased far beyond that for an ordinary resonant system. It should be mentioned that the limit for population inversion is determined by several factors such as (a) the total number of active atoms present; (b) spontaneous decay lifetime; (c) available pump energy; and (d) cavity Q, or quality factor of the cavity. Population inversion will go through a maximum (optimum) value even in the absence of resonance.

If now the system represented by the cavity can be made suddenly resonant, that is, with a high Q at or near the time of this maximum population inversion, the energy stored in excited levels will be stimulated to emit a very intense beam of light. The time required for this energy conversion is the output pulse duration and is determined by the amount of energy present and the suddenness with which resonance is approached, that is, by the rate of change of Q. Obviously, if Q is maximized too slowly, the energy will be dissipated before maximum Q is reached. Peak power is determined by the pulse length since the pulse energy is essentially constant and equal to the stored energy.

Several techniques exist for Q-switching, such as Kerr cell switching, rotating apertures, spinning prisms, and spinning mirrors, but none of these prior to this invention is known to have been involved in connection with a laser array capable of being fired in a selected manner at a high pulse repetition frequency. The Q-switching technique of most interest to this invention is that of rotating a Fabry-Perot plate at a high rate of speed to control Q.

It is an object of this invention to provide a multiple laser sequencer, utilizing a Fabry-Perot plate common to a number of laser units and rotating at a high rate of speed to control the Q, and at the same time serving to direct at a high pulse repetition frequency, very intense output energy pulses from all or selected units of the array, along a designated axis.

In order to obtain a desirable high pulse repetition frequency in the output beam, this invention advantageously utilizes a rotational member disposed substantially in the center of a radial array of laser units. This rotational member comprises a reflecting element rotatable about a central axis of the array and inclined to this axis, together with a Fabry-Perot surface disposed in any one of a number of desired positions as will hereinafter be illustrated. Suitable pumping means are provided to generate population inversions in these units, and in the case of solid state lasers, such pumping is brought about in such a manner as to achieve a high Q condition. That is, the pumping is brought about just before an optically resonant condition is brought about. When resonance occurs, the conditions for coherent oscillation are present and the system becomes a powerful oscillator. By virtue of the successive alignment of the reflecting element with each laser unit, the light energy resulting from such oscillations is directed outwardly along the axis of rotation of the device.

This arrangement does not require that the laser units be disposed in a common plane, although this is the usual configuration. By properly orienting the inclined reflector relative to its axis of rotation and adjusting the angle of the Fabry-Perot plate relative to the axis and the reflector, the lasers may be disposed in a cone of half angle either greater than or less than the aforementioned 90° angle case, with operation being essentially as previously described.

A feature of the invention is its ability to select a desired sequence of firing of the individual lasers, which may differ in their spacing intervals, polarization, output frequency and other characteristics. In addition, the interval between selected individual lasers may be adjusted, either by adjusting the speed of the motor used to drive the rotating device, which adjusts all such intervals proportionally, or by adjusting the angles of disposition, which adjusts the intervals individually.

By virtue of the fact that the particular rotation period can be selected during which one or more of the pump sources are energized, the ouptut of my device can be coded with selected numbers of pulses of selected spacings in time, making it useful as a digital communication transmitter, as an illuminator for a coded seeking device such as in a semi-active missile, as a ranging set to gain increased sensitivity by means of pulse correlation techniques, or in any of a number of devices requiring a high pulse repetition frequency of either uniformly or nonuniformly spaced pulses.

These and other objects, features, and advantages of this invention will be apparent from the appended drawings in which:

FIGURE 2 is a side elevational view partly in section to reveal internal construction of a typical laser unit as well as certain details of the optical arrangement;

FIGURE 3 is a cross-sectional view of a typical laser unit utilized herein;

FIGURE 4 is a perspective view of the transparent prism utilized in accordance with a primary embodiment of this invention, with the path of travel of an output light beam being indicated by arrows;

FIGURE 5 is a perspective view partly in section of the rotating member utilized for carrying the prism depicted in FIGURE 4 as well as the reflector associated with the synchronization arrangement;

Figure 1:
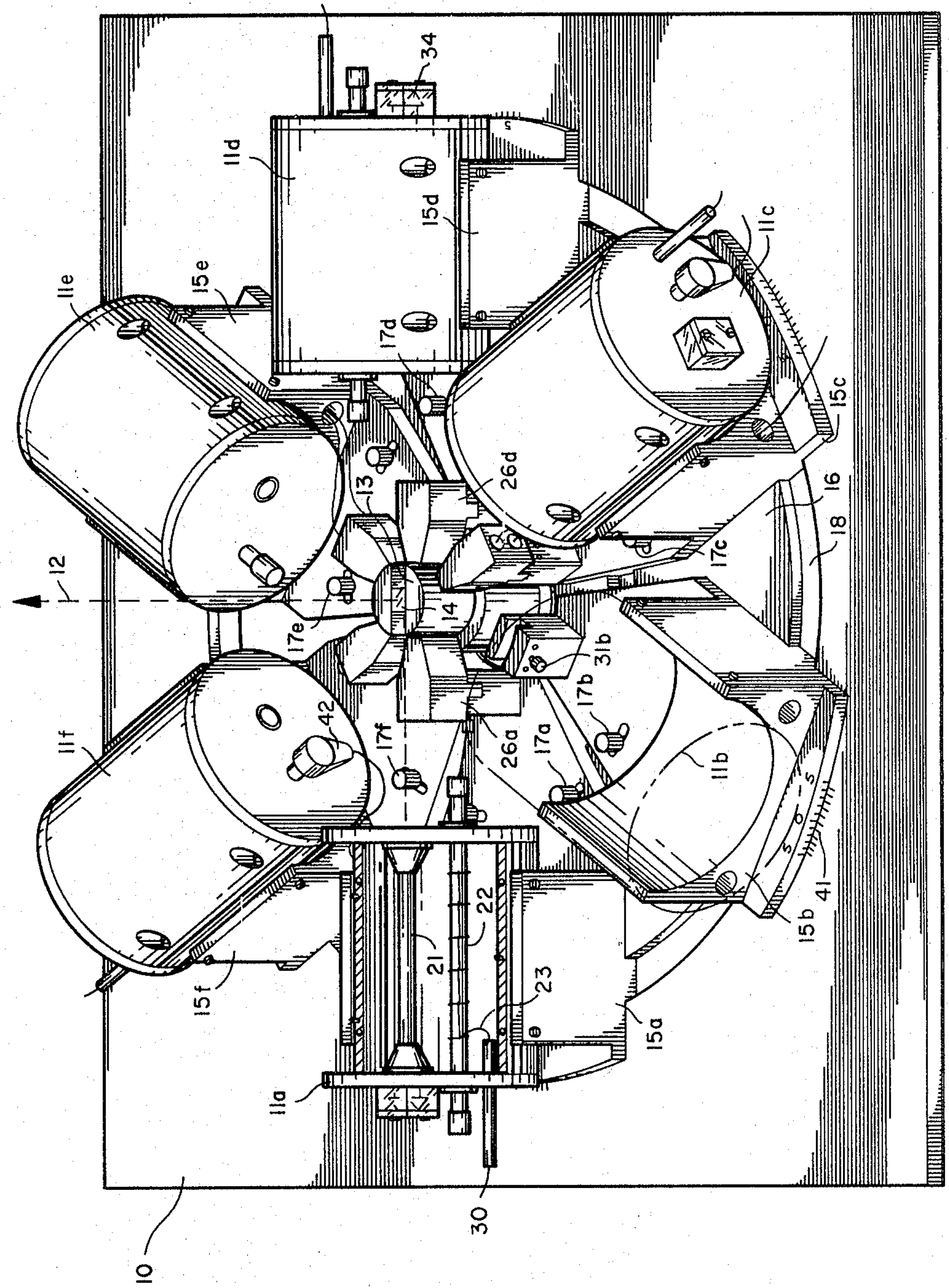
FIGURE 1 is a perspective view of a laser sequencer arrangement in accordance with this invention, with certain portions removed in the interests of clarity.

Referring to FIGURE 1, a laser sequencer 10 is shown which utilizes a plurality of laser units arrayed about a central axis, which are triggered from a common source and which have outputs along the central axis of the unit in accordance with this invention. The individual laser units 11*a* through 11*f* may be symmetrically arrayed about central axis 12, upon which axis is located central rotational member 13. This member carries the prism 14 of high quality glass, quartz, sapphire or the like, one of whose surfaces may form the rotating Fabry-Perot plate. On a lower portion of member 13 a Porro prism 25 may be disposed, as seen in FIGURES 2 and 5, which is employed for synchronization of the flashing of the light sources of the laser units, discussed in detail hereinafter.

The laser units 11*a* through 11*f* are each constituted by a housing having an elliptically shaped polished interior. On the foci of each of these elliptically shaped housings are disposed a rod of active laser material, and a flash tube. Each laser unit is mounted in a support unit, which support units for convenience have been designated 15*a* through 15*f*. Each of these support units is of the proper configuration to receive and secure the respective laser unit 11*a* through 11*f*, and each support unit can be secured to supporting base plate 16 in the desired angular relation. Typically the centerlines of the six support units are disposed 60° apart, but if such be warranted, by loosening appropriate ones of the pairs of adjustment screws 17*a* through 17*f*, these units can be moved for a limited number of degrees away from a precisely symmetrical array, as permitted by the slots in which these screws are located. Other tapped holes (not shown) in the base 16 may be utilized for receiving these screws if substantial movement of a laser unit away from the illustrated position is contemplated. Encircling groove 18 in base plate 16 enables the maintenance of the desired constant distance of each laser unit from the central axis 12, when such is desired, and facilitates the desired axial orientation of each laser unit. Alternatively, the laser units may be moved radially in the support units if such is desired.

Considering the laser units in detail, it will be noted that the upper housing member of laser unit 11*a* has been removed in FIGURE 1, exposing the cylindrically shaped laser rod 21, and the high intensity light source 22, which are disposed on the foci of the elliptical cavity of this laser unit. See FIGURE 3. The active material of rod 21 may be ruby, or for lower threshold, of neodymium doped calcium tungstate, and have exceedingly flat ends. Other laser units are of identical construction, each containing a laser rod and a flash tube, which are disposed in essentially parallel spaced relation, and in this instance are all disposed in a horizontal plane common to the entire device. This is to say, when the upper and lower housing members constituting each laser unit are secured together, they form an elliptical cavity whose major axis in the preferred embodiment shown is in a horizontal plane. The housing halves may be made of aluminum that has been highly polished to give an excellent reflective surface. To assure uniformity, I preferably make the housing halves from a common length of aluminum. A three inch diameter shaft of aluminum is split along its axis to form two half cylinders, and then by the use of a 2½ inch milling cutter inclined at a precalculated angle, a half elliptical slot is milled into the flat side of each piece. The interior surfaces are then highly polished and cut into sections which, when mated, form cavities of interior elliptical configuration and circular exterior configuration. Alternatively, these cavities may be cast or molded from a suitable material and coated on the inner (elliptical) surfaces with a reflective coating such as evaporated silver or aluminum.

By joining each housing half together in the general manner shown in FIGURE 1, including the use of properly apertured aluminum end plates 24, it is seen that the laser units are of uniform construction and each possesses the requisite internal elliptical configuration. As will be noted from FIGURES 1 and 2, support members 35 may be employed to support ends of the laser rods in the apertured end plates, without interfering with the light transmitting properties of the ends of each laser rod. Small screws or the like may be used to secure the housing halves together, and the end plates in position.

In accordance with this invention, a centrally disposed Fabry-Perot plate is used for selectively controlling the optical resonance in the several laser rods, each of which is equipped at its radially outer end with a so-called roof top reflector 34. By the previously described process of Q-switching, resonance in these cavities, known as Fabry-Perot cavities, is controlled in such a manner that the competition between the pumping source 22 on the one hand, which is trying to increase the population inversion, and the lasing action, which is trying to decrease the population inversion, is largely eliminated. More particularly, the cavities of the present system are made non-resonant, or in a low Q condition during the pumping period when the population inversion is increasing, thus enabling the degree of population inversion to be increased far beyond that for a resonant system. An optimum Q value representing maximum population inversion will be reached even in the absence of resonance, and if at that point the system can be made suddenly resonant, the energy stored in excited levels will be dumped by laser action very suddenly. The time required for this energy conversion is the output pulse duration and is determined by the amount of energy present and the suddenness with which the resonance is approached, that is, by the rate of change of Q. If Q is maximized too slowly, the energy is dissipated before maximum Q is reached.

A single centrally disposed Fabry-Perot plate therefore is advantageously employed for selectively controlling the optical resonance of the several units. The Fabry-Perot plate may be mounted in any of a number of positions with respect to central rotational member 13, as will hereinafter be discussed in conjunction with FIGURE 11, but as will be seen in the embodiment in accordance with FIGURES 1, 2 and 4 through 6, the Fabry-Perot plate may be regarded as surface 39 of the prism 14. This is to say that on this portion of the prism's surface a special coating has been applied, which is sensitive to the resonant wavelength, such that at this wavelength, light is largely reflected. In typical cases, 98% of the light is reflected and 2% transmitted; substantially none is adsorbed. Accordingly, the Fabry-Perot plates should be selected to correlate with the active laser material used in the laser units.

By virtue of the described arrangement, high peak powers can be obtained by this Q-switching operation, in which the rapidly rotating, partially transmitting Fabry-Perot plate 39 is caused to face the spaced laser cavities in sequence. Surface 39 is made to high tolerances of flatness, typically $\frac{1}{20}$ of a wavelength of the output light. As the rotating normal to surface 39 achieves alignment with a laser rod 21, the laser unit will fire, providing of course that it has been optically pumped within the previous relaxation time of its metastable state, and provided that all alignments are correct. The use of a roof top reflector 34 at the opposite end of the laser rod is in accordance with published teachings.

The hypotenuse surface 38 of prism 14 serves as a reflecting element for the high energy output beams transmitted through the Fabry-Perot plate 39, with the arrangement being such that the output takes place along axis 12 for all the units of the laser array. This is to say, the prism 14 is constructed to have "leg" angles of 45° and an angle of 90° opposite the surface 38. This will of course result in the normal of output face 40 desirably being coincident with the axis 12.

The central rotating member is driven by motor 43, indicated in FIGURE 2, to speeds in the vicinity of 10,000 to 15,000 r.p.m., so as to cause the Fabry-Perot plate 39 to be within the alignment tolerance of a few seconds of arc from the aligned position with each laser rod only for the extremely short period desirable for the achievement of proper lasing action.

Referring to the enlarged view of the central rotational member 13 revealed in FIGURE 5, it will be seen that the prism 14 and the reflector 25 are secured between two halves of the upper portion of the central rotational member 13. The arrangement is such that an angled portion 19 is provided to support prism 14 in the desired position in which the Fabry-Perot surface 39 is sequentially perpendicular to the axes of the laser rods. The provision of the angled portion serves to dynamically balance the prism arrangement 14, and if the prism is made of glass, the angled portion 19 is made of aluminum inasmuch as its density is quite similar to that of glass.

As will be apparent, the right and left halves of the central rotational member together form a hollow central portion in which the drive shaft 36 from motor 43 may be received so that the Fabry-Perot plate and the reflector 25 can be driven at the requisite high rate of speed. The upper portion of drive shaft 36 may be in the form of a spherical member 37 received in a complementary configuration on the interior of the rotational member, this construction enabling the position of the central rotational member to be adjusted slightly should this become desirable. A number of tightening screws (now shown) may be employed for holding the halves of the upper portion of the central rotational member together so as to clamp the prism 14 and the reflector 25 in a firm operating position.

The light sources **22*a* through 22*f* used to pump the respective laser rods 21*a* through 21*f* to a high energy level may be of flash tubes such as EG & G type FX-38, which are 3 inch linear flash tubes, across the end terminals of which a voltage of say 1,000 volts is impressed; note the use of tube cap 42. In addition, a wire 23 is wrapped or laced around each flash tube and connected via insulator 30** disposed in the laser housing so that 15,000 volts can be supplied thereto. This latter voltage is supplied to the high voltage winding to cause an ionization of the xenon gas used in these tubes in order to bring about the brilliant flash of light required for the pumping of each laser rod. As will be further discussed in conjunction with FIGURE 9, this pumping is brought about in a very short interval of time just before alignment of the laser rod with the rotating Fabry-Perot plate.

Returning to FIGURE 2, a cross-sectional view taken along a diametrical portion of base place 16 is there revealed, which view also reveals a side elevational view of typical laser unit **11*a*. In view of the requirement that the light source 22 flash before the Fabry-Perot plate portion 39 of prism 14 comes into alignment with the laser rod of a given laser unit, I prefer the use of synchronization units 26*a* through 26*f* disposed in cooperative relationship with the aforementioned right angle prism 25**, latter device serving to bring about the respective flashing of the light sources at the correct time for the achievement of proper pumping of the laser units.

As shown in FIGURES 1 and 2, the synchronization units are mounted on the radially inner portions of respective support units **15*a* through 15*f* so as to be spaced about the central axis 12. Each of these synchronization units is individually adjustable on its respective support units and each is equipped with a light source 27 and a photodetector such as a phototransistor 33, with the alignment and disposition of the various elements being such that the periodically aligned reflector 25** causes light from the light source to fall upon the photodetector. Some of these details may be observed in FIGURE 2, but will be seen with more clarity in simplified FIGURE 6, along with the other significant optical aspects of this device.

Figure 6:
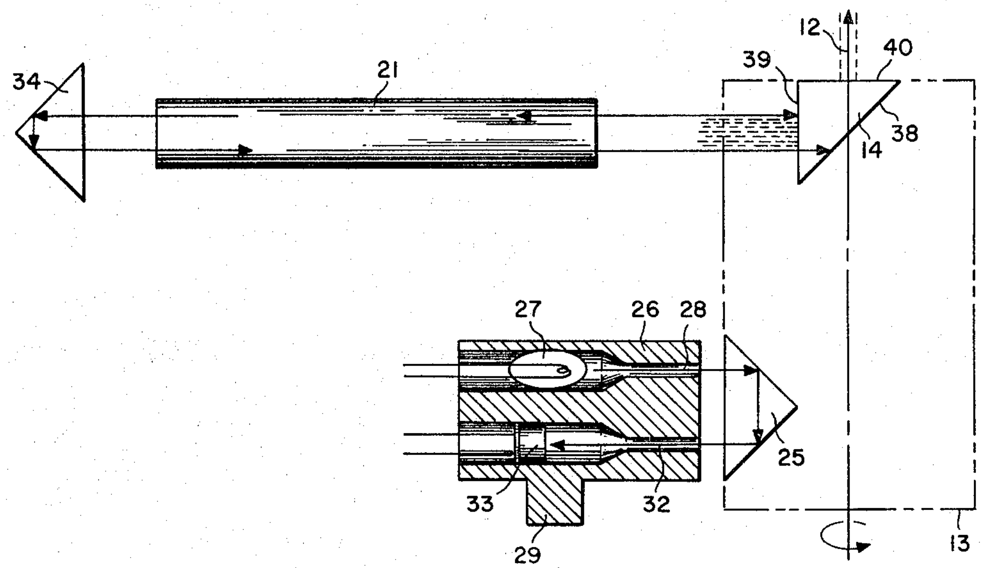
FIGURE 6 is a diagrammatic sectional view, to a some-what larger scale, of significant optical portions of this invention.
Figure 9:
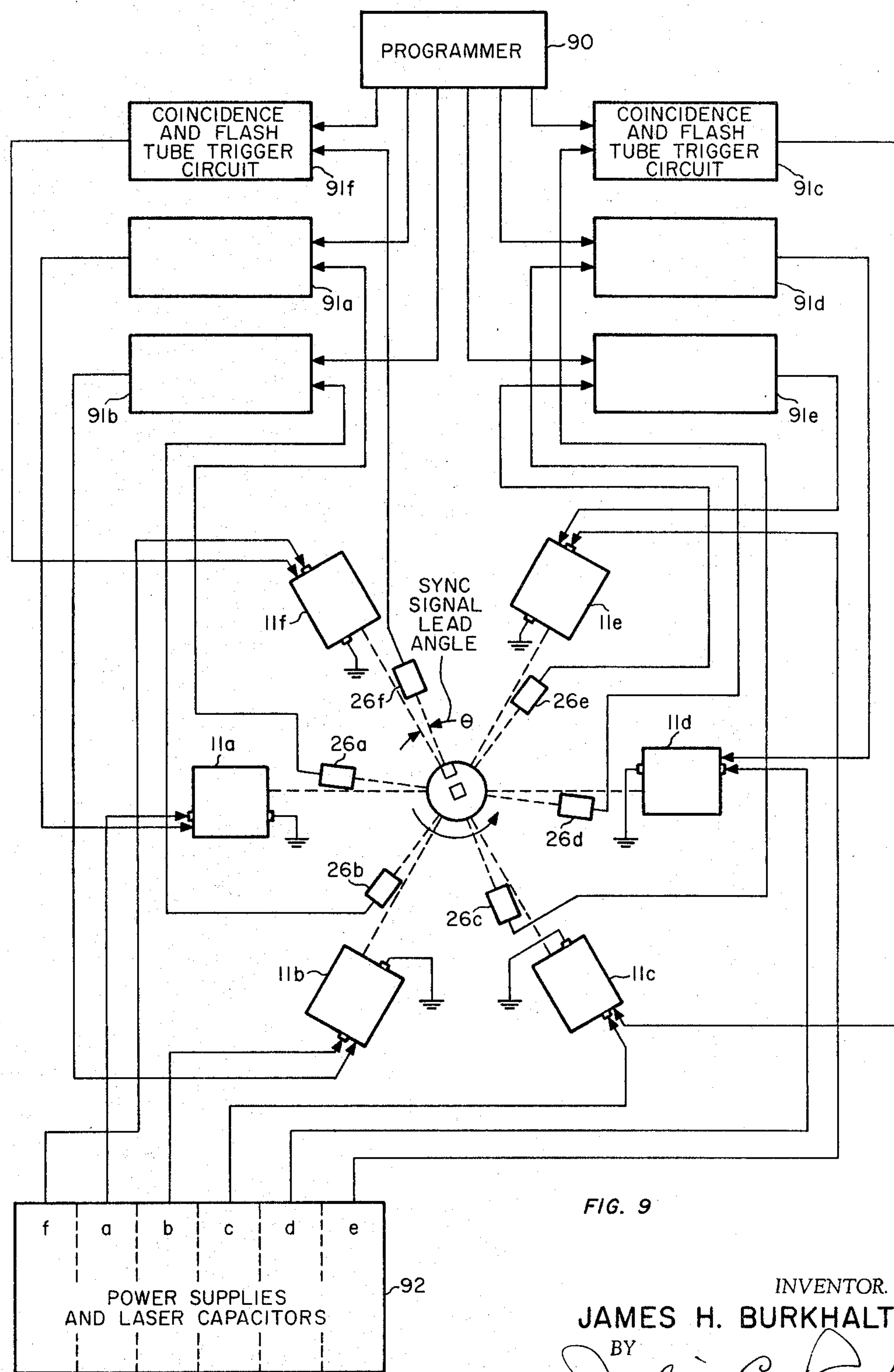
FIGURE 9 is a block diagram illustrating the use of a programmer in conjunction with the coincidence and flash tube trigger circuits so that selected laser units of the array may be fired.

FIGURE 6 is a diagrammatic sectional view of significant portions of a typical synchronization unit and revealing its relation to the reflector 25. For simplicity, the lower portion of this figure is shown as coplanar with the upper portion, whereas in reality the synchronization unit 26 is disposed about the axis 12 by a small angle in such a manner that reflector 25 reflects the beam from lamp 27 emanating through aperture 28 into aperture 32 and thence onto photodetector 33 prior to the alignment of Fabry-Perot 39 with its image in roof top prism 34. The amount of this lead angle, shown as angle $\theta$ in FIGURE 9 is determined by the synchronization parameters of the pumping system and is adjustable for each unit 26 by losening the respective one of set screws **31*a* through 31*f*, and moving the lug or mounting member 29** with respect to its slot in the upper part of the radially innermost portion of the support unit.

Figure 7:
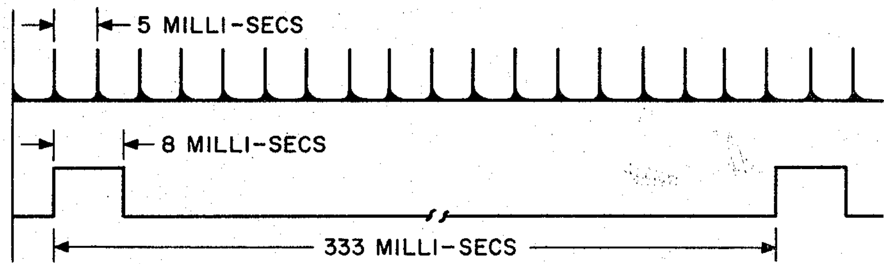
FIGURE 7 is a timing diagram illustrating coincidence of one or more synchronizing pulses from the optical synchronization units with periodically recurring pulses utilized in conjunction with the triggering of designated laser units.

As a result of the light from lamp 27 periodically falling upon each photodetector, a series or succession of light pulses will be generated by each photodetector, which pulses are indicated schematically in FIGURE 7. These pulses are employed for timing the high voltage impulses directed to the flash tube disposed in each laser unit, as will be described in conjunction with FIGURE 8. Photodetector 33 may for example be a phototransistor of type 2N469A, made by General Transistor.

FIGURE 6 also shows a simplified version of the optical arrangement of the laser rod 21 of active laser material, the rotating prism 14, and the roof top prism 34 disposed at the radially outwardly end of each laser rod. As the (partially transmitting) Fabry-Perot plate surface 39 of prism 14 comes into alignment with a properly pumped rod, a very intense optical oscillation takes place. The transient alignment of Fabry-Perot plate and rooftop prism causes such an intense build-up of light energy in the laser rod that the energy will be discharged from the rod as an intense beam of light toward the Fabry-Perot plate surface 39, as shown schematically by the large number of lines at the right hand end of rod 21. Light passing through surface 39 is reflected from the innermost or hypotenuse surface 38 of this prism and then directed outwardly through face 40 along axis 12, as shown in detail in FIGURES 4 and 6. By the controlled firings of the several laser units, bursts of light energy from the units take place along the axis 12 in a sequence that may be varied to achieve pulse time coding.

Figure 8:
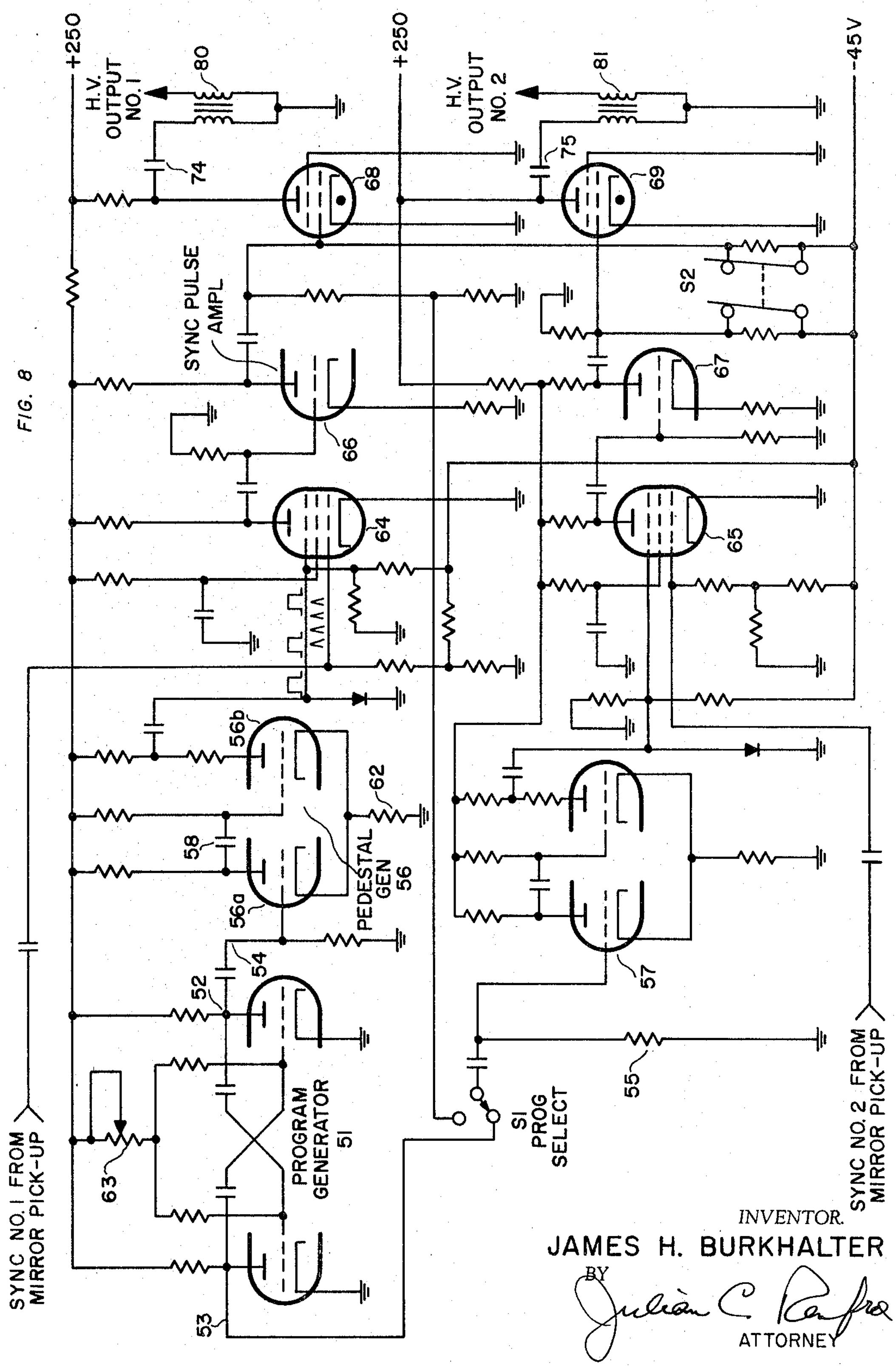
FIGURE 8 is a circuit diagram of a type that may be employed for selective triggering of a pair of laser units.

FIGURE 8 is concerned with the circuitry employed in conjunction with the generation of the high voltage output pulses for bringing about the periodic flashing of the flash tubes 22 of the laser units as shown. In this particular illustration, the circuitry for causing the flashing of two high intensity flash tubes is shown, so if this type of circuitry is desired, six of the channels of the type shown in each half of FIGURE 8 would be required for flashing of all six laser units of FIGURE 1, with, however, only a single program generator being required for all channels.

The program generator, in the form of a free-running multivibrator 51, is employed for generating the timing triggers or pedestals which are used for selection of the desired synchronizing pulses that are amplified to form the pulses for triggering the light sources. The multivibrator 51 is connected so as to furnish a pair of outputs on leads 52 and 53. These outputs are each differentiated by respective R-C networks 54 and 55, with the resulting spikes from these outputs each directed to a so-called pedestal generator, which may in this exemplary case take the form of monostable multivibrators 56 and 57. Since the two channels shown in FIGURE 8 are identical, for convenience only the channel shown in the upper portion of FIGURE 8 will be described in detail.

The right half **56*b* of the monostable multivibrator 56 is normally in the on or conducting state, whereas the left half 56*a* is normally cut off due to the biasing voltage across common cathode resistor 62 caused by the plate current of 56*b*. Upon a positive spike from the differentiator 54 being received by the grid of 56*a*, this tube half is caused to assume its conducting condition, and thereafter experience a sudden drop in its plate voltage as a result of the voltage drop across its plate resistor. This negative drop at the plate of 56*a* is coupled through the capacitor 58 to the grid of tube half 56*b*, suddenly cutting off the flow of current through this tube half. At this time the plate of 56*b* suddenly increases to the level of the supply voltage. This action simultaneously removes the cut-off bias voltage previously across resistor 62, allowing 56*a* to remain conducting after the positive spike has passed. The circuit remains in this state until capacitor 58 charges through the associated resistors to the turn-on bias level of tube half 56*b*. At this time the beginning conduction current of 56*b* again produces a negative bias on 56*a* by means of the common cathode resistor 62**.

This latter is a regenerative action since the tendency for **45*a* to cut off starts the plate voltage of 56*a* to rise, and this positive going signal assists in turning on 56*b* in a regenerative manner. Thus, the plate voltage 56*b* quickly drops to its original quiescent value, the preceding action thus producing a series of spaced pedestals on the output lead connected to the grid of the coincidence amplifier 64, the duration of each pedestal being determined by the time constant of capacitor 58** and the associated resistances.

Coincidence amplifier 64, which may be a vacuum tube of type 5784, is designed to receive both the train of synchronization pulses from the respective phototransistor 33 as well as the periodically occurring square wave timing pulses from the pedestal generator. The relationship of the short pulses from the photodetector, occurring at approximately a 5 millisecond pulse repitition rate, to the rather broad pedestal pulses is illustrated in detail in FIGURE 7. The pulse rate from the pedestal generator may be three pulses per second, or one pedestal pulse every 333 milliseconds, this rate of course being controlled within operating limits by 500K potentiometer 63 shown in conjunction with the program generator. The coincidence amplifier 64 is preferably of the tube type 5784 because the transconductance of the suppressor grid of such tubes is higher than in most pentodes. The control and suppressor grids are biased beyond cut-off, so that a signal must be simultaneously present on both grids in order for such tubes to conduct.

In other words, I can control the frequency of firings by the repetition rate of the 8 millisecond timing pulse, which will arrive at the coincidence amplifier during the arrival of at least one pulse from the mirror pickup if member 13 is rotating in the design speed range. Synchronization of the firing of lamp 22 is therefore assured by the timing of the synchronization pulses from the mirror pickup. It should be noted that even if the 8 millisecond timing pulse pedestal intercepts two pulses, only one firing of the respective lamp will occur, for the recovery time of the apparatus is usually too great to enable two firings to take place spaced a mere five milliseconds apart.

As coincidence tube 64 or 65 conducts, it in effect puts out a pulse representing a sync pulse that has been amplified, which pulses are of course now negative-going as a result of vacuum tube inversion. Each pulse is then reinverted and amplified by respective triode amplifiers 66 and 67, with the outputs from these tubes being applied respectively to the control grids of thyratron tubes 68 and 69. Each of latter tubes, which may be of type 5727/2D21W, is maintained in non-conducting state until such time as a pulse from the triode amplifier triggers it into conduction. At that time, capacitors 74 and 75, which have been charged to the supply voltage of say 250 volts, are permitted to discharge. Capacitor 74 is connected between the plate of tube 68 and the primary winding of transformer 80, and capacitor 75 is connected between the plate of tube 69 and the primary winding of transformer 81, so the discharge of each capacitor causes the generation of a high voltage pulse in the secondary of the respective high voltage transformer 80 or 81.

The high voltage pulses from the secondaries of these transformers are applied to the triggering electrodes 23 of respective flash tubes 22, which are normally maintained at a potential level below their ionization level, but in which ionization commences upon arrival of a high voltage pulse in the vicinity of 15,000 volts, causing the tube to flash and proceed to bring about laser action.

Switch S1 enables the operator to selector the manner in which the lower channel shown in FIGURE 8 is actuated. When in the position shown, this switch functions to connect the output on lead 53 of the program generator to the grid of the left half of tube 57, so that the firing of the flash tube associated with transformer 81 will be brought about as a result of coincidence of a pulse from the mirror pick-up with a timing pulse pedestal. However, when this switch is moved to the alternative position, the grid of tube 57 receives its input pulse from the sync pulse amplifier tube 66, thus causing the flash tube of the second channel to fire as a result of a signal that had as its purpose the causing of the flash tube of the first channel to fire.

Switch S2 serves as the activation switch of the circuit of FIGURE 8 and when in the position illustrated, prevents the firing of the thyratron tubes 68 and 69 by placing −45 volts on the grids of these tubes. When the switch has been moved to the alternative position, firing of the flash tubes can take place as a result of the reduction of grid bias on the thyratrons by virtue of 150K bias-dropping resistors used in conjunction with this switch.

As will be apparent to those skilled in the art, there are a number of means available for bringing about a selected firing order or firing sequence of the various laser units that constitute a laser array. Referring to FIGURE 9, programmer 90 is disposed so as to bring about a selected firing order, this device being connected to each of the coincidence and flash tube trigger circuits 91a through 91f so as to supply the equivalent of the timing pulse pedestals discussed in conjunction with the circuit in accordance with FIGURE 8.

The synchronization units 26a through 26f generate as before the series of closely spaced synchronization pulses of the type depicted in FIGURE 7, which pulses are delivered to the respective trigger circuits 91a through 91f. When one of these synchronization pulses is in coincidence in a trigger circuit with a pulse supplied from programmer 90, this will cause the generation of a high voltage signal in the trigger circuit, which is of course delivered to the winding 23 of the flash tube of the respective laser unit 11a through 11f so as to cause that unit to fire at the time that the Fabry-Perot plate of the central rotational member is in alignment with the laser tube of that unit. The manner and order in which timing pulses are generated by programmer 90 is very flexible, and its operation will be more apparent in conjunction with the description of FIGURE 10.

A voltage of approximately 1,000 volts is connected across the terminals of each flash tube 22, with it being understood that a considerable amount of energy flows through the flash tube each time the high voltage winding is energized. As an example, 25 joules of energy may be used for flashing the light sources 22 each time a laser rod of calcium tungstate is to be pumped, with considerably more energy than this being required in the event ruby rods are used as the laser material. Because of the energy requirement, I preferably use a capacitor bank 92 in conjunction with the laser units, with it being understood that a respective one of capacitors 92a–92f of approximatley 50 microfarads may be utilized in conjunction with the supply of electric power to the terminals of each flash tube.

Figure 10:
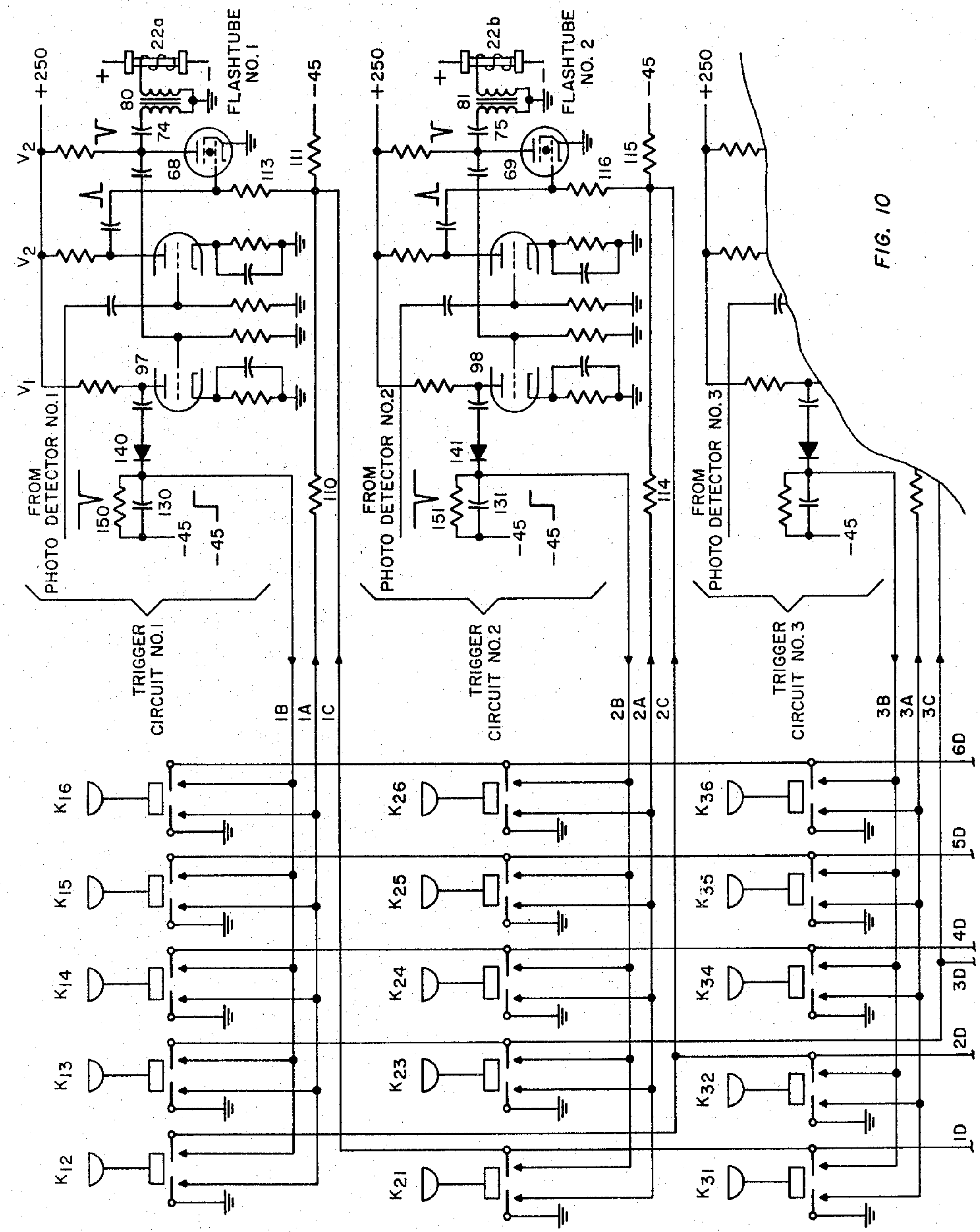
FIGURE 10 is an abbreviated showing of a laser selecting arrangement wherein certain coding of the output pulses may be brought about by selected push-buttons.

A variety of programmers 90 may be used for making the selections of laser unit firing order dependent upon the form of the information to be coded. A simple mechanical illustration for the six laser case is illustrated in FIGURE 10, wherein the code may be selected from an array of keys resembling typewriter keys, such as keys $K_{12}$ through $K_{36}$ with it being understood that a total of 30 keys would be illustrated for this embodiment if drawing size permitted, with the key designation extending up through key $K_{65}$. Also a total of six trigger circuits would be shown rather than the lesser number shown. Each key actuates two switches, one for each laser associated with the subscripts of each key number. Thus, for example key $K_{25}$ has a switch for laser 2 and one for laser 5 and the circuits are so designed that laser 2 will fire first, followed by laser 5.

The action of the circuit is as follows: Upon pressing a given key, such as for example key $K_{12}$, two switches are closed, the left switch being associated with the first subscript, the right switch being associated with the second subscript. In the case of key $K_{12}$, the left switch grounds line 1A thereby changing the biasing level on the grid of the thyratron 68 from minus 45 volts to an intermediate voltage between minus 45 and ground due to the fact that grounding 1A creates a voltage divider consisting of resistors 110 and 111. The minus 45 volt bias present prior to closing key $K_{12}$ was sufficient to prevent the incoming positive-going pulses to this grid from the photodetector from triggering the thyratron. The new bias level is so chosen that circuit noise will not trigger the thyratron 68, but incoming pulses originating at photodetector 22a will now cause this thyratron to fire. Thus upon pressing key $K_{12}$ laser unit number 1 (flash tube 22a) will fire on the first subsequent alignment of the Fabry plate with laser unit 1. The closing of key $K_{12}$ also causes the righthand switch to connect line 1B to line 2D, line 2D connecting with line 2C. Thus, the grid bias on the thyratron associated with laser unit number 2 will be controlled by the voltage on line 1B. Upon making this connection, this voltage will quickly be established at slightly less than minus 45 volts as determined by the values of various resistors in the circuit. However, upon the firing of thyratorn 68, a voltage pulse will be generated on the grid of tube-half 97 which will in turn generate the positive-going voltage step function on line 1B, which changes the bias level on the thyratron 69 of trigger circuit number 2 to a valve between −45 volts and ground potential sufficient to allow triggering from an incoming positive-going pulse from photodetector number 2. Therefore, laser unit 2 (flash tube 22b) will fire at the first alignment subsequent to the firing of laser unit number 1, which was the action desired in pressing key $K_{12}$.

Referring again to thyratron 68, the sudden drop in voltage at the plate of thyratron 68 due to its firing causes a high voltage output from transformer 80 to cause flash tube 22a of unit number 1 to fire as previously discussed. Subsequently, the back E.M.F. generated in transformer 80 causes the anode of thyratron 68 to drop below its ionization potential, thereby extinguishing the thyratron, and thus returning the thyratron to its biased-off state, ready for the next operation. The resulting negative going pulse occurring at the anode of thyratron 68 resulting from this action serves to generate the previously described positive going voltage step function on line 2C by virtue of the negative going pulse being inverted by tube-half 97 and charging capacitor 130 through diode 140. The diode 140 acts to isolate the capacitor 130 from the trigger circuit after it has charged. The time constant of capacitor 130 and resistor network 114 and 115 is very long compared to the maximum delay between desired firing sequences. Thus, the grid of thyratron 69 is held at a level such that it can be fired from the incoming pulse from photodetector number 2 during one revolution of the Fabry-Perot plate. The action in the trigger circuit 2 occurring when thyratron 69 is fired in response to a pulse from photodetector number 2 is the same as previously described in trigger circuit number 1. However, the charge deposited on capacitor 131 is not used since none of the keys associated with line 2B is depressed. Resistor 151 serves to bleed off this positive charge in order to have this circuit ready for subsequent operations. The operation resulting from the depression of other keys of FIGURE 10 should now be apparent.

Figure 11:
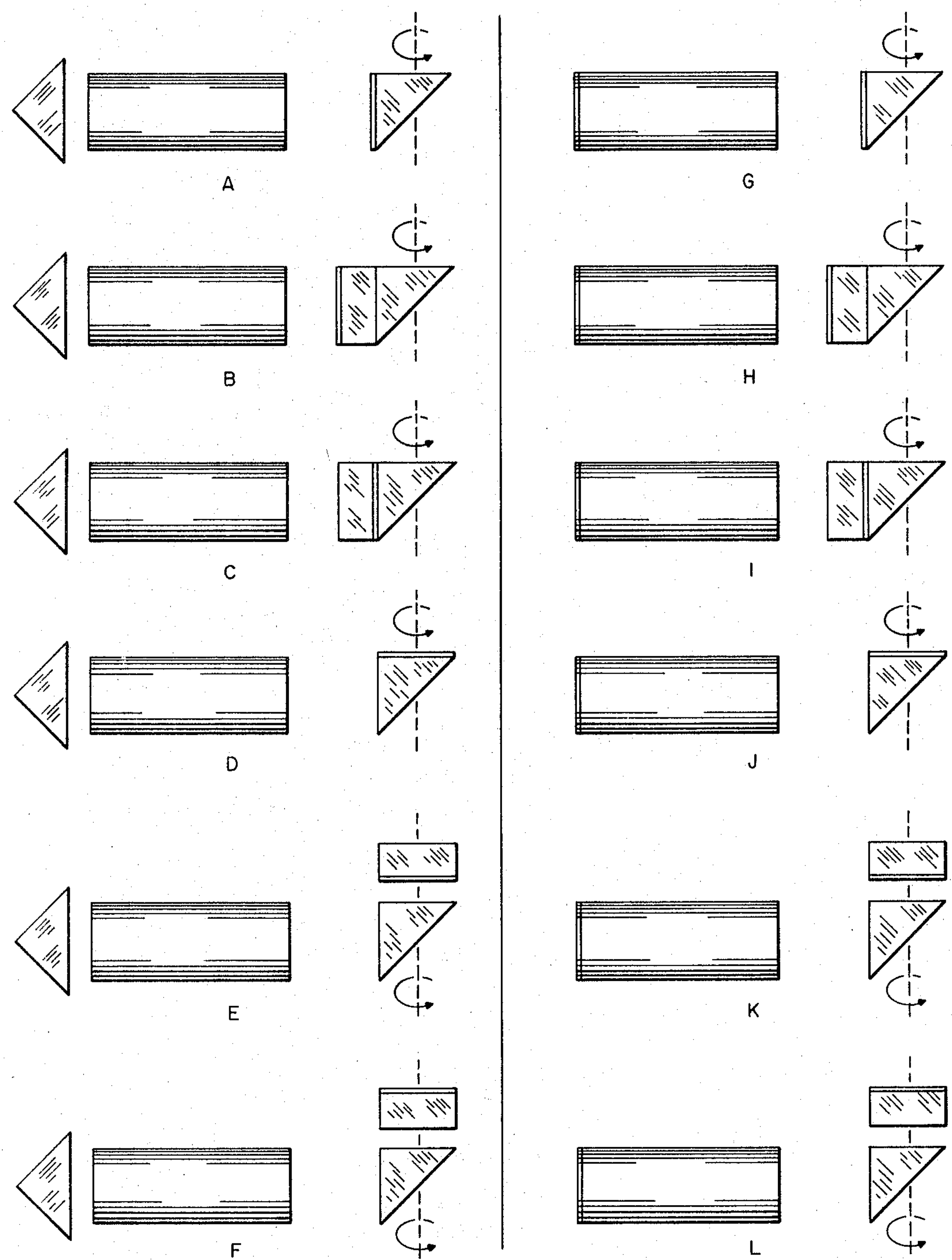
FIGURE 11 is a schematic showing of various laser rod-Fabry-Perot plate arrangements that may be employed in accordance with this invention.

Although I have shown and described in conjunction with FIGURES 1, 2, 5, and 6 the arrangement wherein the surface of prism 14 nearest the laser units is the Fabry-Perot plate, as set forth in FIGURE 11, the Fabry-Perot plate could alternatively be in a number of other locations. This is to say, in embodiment A of FIGURE 11, the Fabry-Perot plate is in the position corresponding to that of the earlier mentioned figures, with a so-called roof top reflector being employed on the opposite end of the laser rod in order that automatic alignment will be provided for the resonant cavity.

In embodiments B and C shown in FIGURE 11, the Fabry-Perot plate is shown as a surface of a piece of material separate from the prism serving as the inclined reflector for directing the output beam along the desired output axis. However, embodiment B differs from embodiment C in that the Fabry-Perot plate in latter embodiment is disposed between the supplementary stratum and the prism itself.

In embodiment D the Fabry-Perot plate is disposed in such a manner that the light oscillations taking place in the optical cavity actually occur through the material constituting the prism itself, which is to say, the light leaving the right hand end of the laser rod enters the near face of the prism is reflected from the inclined reflecting surface and strikes the Fabry-Perot plate and then returns along the same path as the resonant condition continues, with only a small portion of the light having been transmitted through the Fabry-Perot plate. Although this is not the preferred embodiment of this invention, it has the advantage that the direction of the Fabry-Perot surface remains unchanged as the prism rotates.

In embodiments E and F the Fabry-Perot surface has again been placed upon a separate piece of transparent material, which in these cases does not necessarily rotate with the rotating prism. As in case D, the prism is now optically within the resonant cavity and the Fabry surface is fixed in its orientation. In contrast to D however, problems of possible wobble of the Fabry-Perot surface do not occur. In A through F, the roof top has been shown as separate from the laser rod, but alternatively, the rod could be configured to have a roof top end thereon.

Embodiments G through L are similar to A through F respectively except the roof top reflector prism is replaced with a flat Fabry-Perot surface contiguous with the laser rod.

Figure 12:
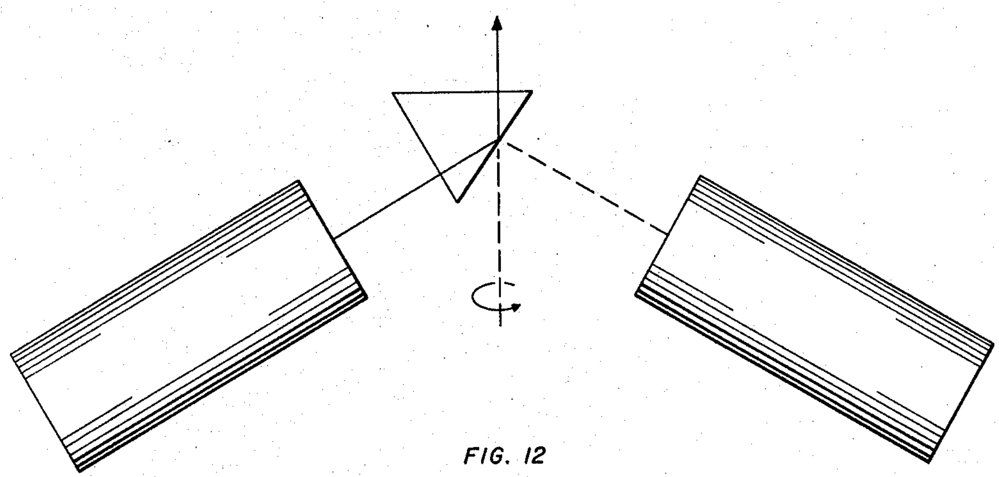
FIGURE 12 is a schematic showing of a non-planar laser array, in which the rods of the various laser units are disposed in a generally conical arrangement rather than in a common plane, requiring the use of a non-right angle prism.
Figure 13:
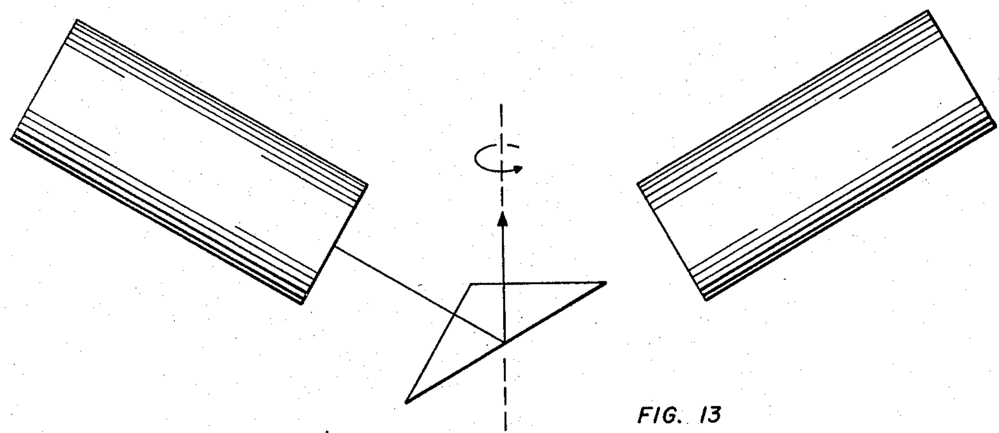
FIGURE 13 is an arrangement in which the rods of the laser units of the array are disposed in a different conical arrangement, requiring the use of a different non-right angle prism.

My invention has been primarily explained in conjunction with the laser units disposed in a common, flat plane, which may be regarded as a particular case of a cone of 90° half angle. However, as illustrated in FIGURES 12 and 13, the laser rods may be disposed in a cone about the axis 12, which cone is swept out by the rotating normal to the Fabry-Perot surface or its image. The cone may be convex or concave to the output direction, as illustrated in FIGURES 12 and 13 respectively.

Inasmuch as it is usually desired that the output beams of the various laser rods be along a common axis (axis 12), then the rotating prism must in those instances be an isosceles prism, that is, the hypotenuse plane serving as the reflecting surface must form equal angles with the two leg planes. This is to say, the angle the surface of the prism nearest the laser rod makes with the reflecting surface is equal to the angle that the output face makes with the reflecting surface. As will be noted, these angles are substantially larger in FIGURE 12 than in FIGURE 13.

Figure 14:
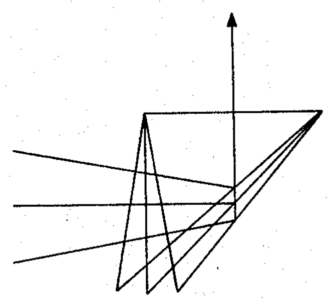
FIGURE 14 is a schematic showing of representative combinations of various prisms and associated cone angles that can be utilized in accordance with this invention, illustrating the fact that a wide tolerance in prism angle can be generated by adjustment of cone angle or vice versa.

This can be further illustrated by FIGURE 14 in which three prisms are shown superimposed, thus corresponding to three cases of cones of half angles less than 90°, equal to 90°, and greater than 90°. In all cases, the output face is perpendicular to the light after reflection, and the output is along a common axis, with the Fabry-Perot plate preferably being on the surface of the prism that is perpendicular to the axis of the laser rod.

Figure 15:
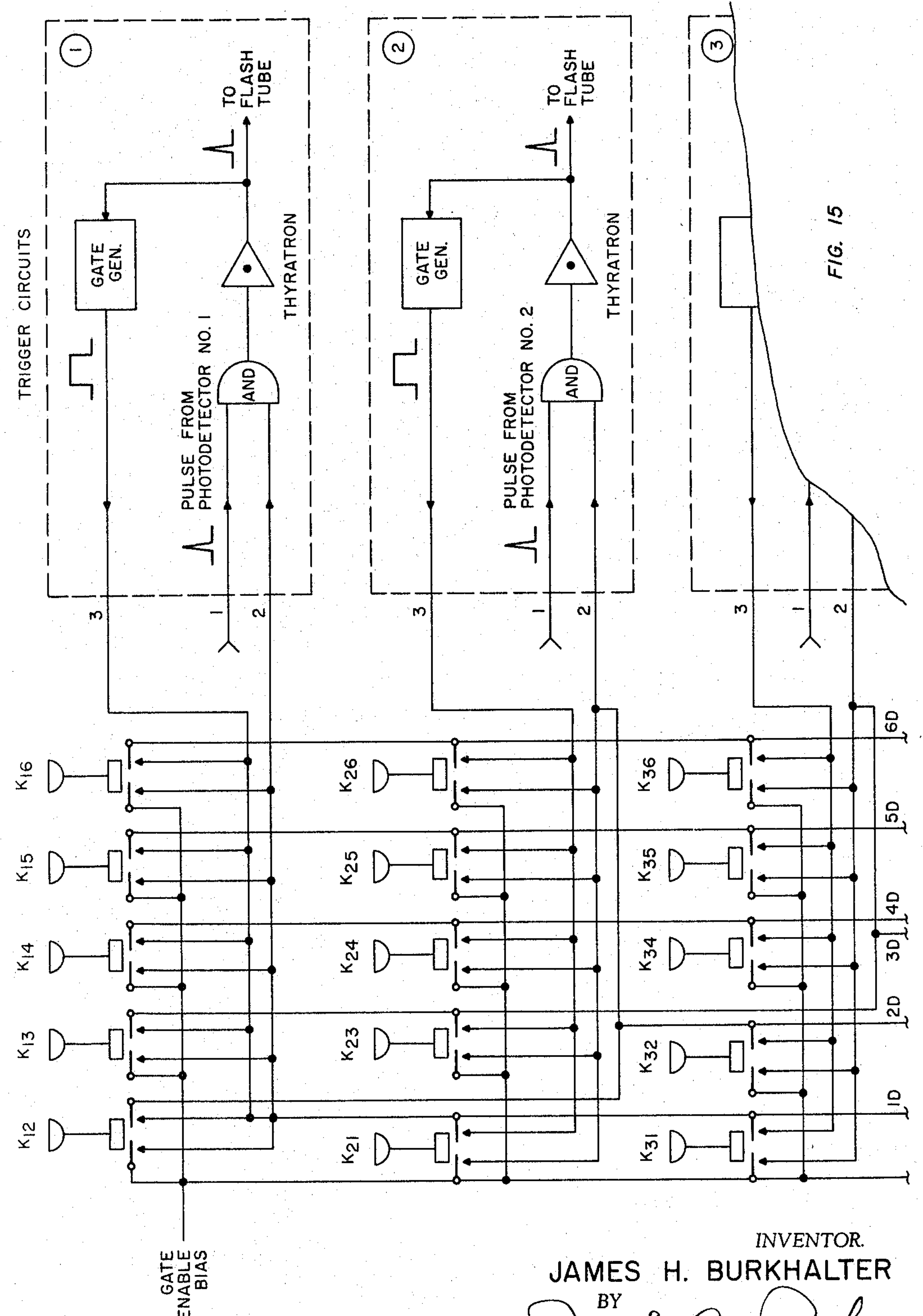
FIGURE 15 is a logic diagram representing the circuits shown in the circuit diagram in accordance with FIGURE 10.

While in the previous descriptions of the sequencing device I have shown an exemplary circuit, for reasons of convenience I now prefer to show, by a generalized functional diagram, a sequencer which is capable of a more flexible operation. FIGURE 15 is a functional diagram of a sequencer which performs the same operation as shown in FIGURE 10, that is, it allows the selection of two sequential operations by depressing one of thirty buttons. As shown in this figure, the trigger circuit comprises an AND gate having two inputs. Input number 1 is from the photodetector and input number 2 is from a separately generated gate source. In accordance with the well-known principles of AND gate operation, the positive going input pulse from the photodetector present at input number 1 will not appear at the AND gate output unless an enabling pulse is present on input number 2. When this exists, the incoming positive going pulse will trigger a thyration which operates the flash tube, thus firing the associated laser. The thyratron output pulse simultaneously triggers a gate generator, which serves to produce an enabling gate pulse on output line 3 whose duration is equal to the time of one revolution of the Fabry-Perot plate, and which then can be used in the triggering of the other selected laser unit.

The switching scheme may be explained by assuming that key $K_{12}$ is depressed. This action is designed to fire laser number 1 and laser number 2 in sequence. Depressing key $K_{12}$ puts a steady enabling bias on line 2 of trigger circuit number 1. Thus, the first incoming pulse from photodetector number 1 initiates the firing of the flash tube and laser. The depressing of key $K_{12}$ also connects line 3 from trigger circuit 1 to line 2 of trigger circuit 2. Thus, the gating pulse generated at the time of firing of trigger circuit 1 appears as an enabling gate for trigger circuit number 2, and trigger circuit number 2 will fire at the next incoming pulse from photodetector number 2, completing the desired sequence. It is to be understood that FIGURE 15 is intended to represent a set of 30 keys and 6 trigger circuits, in a manner very similar to that previously illustrated in FIGURE 10.

Figure 16:
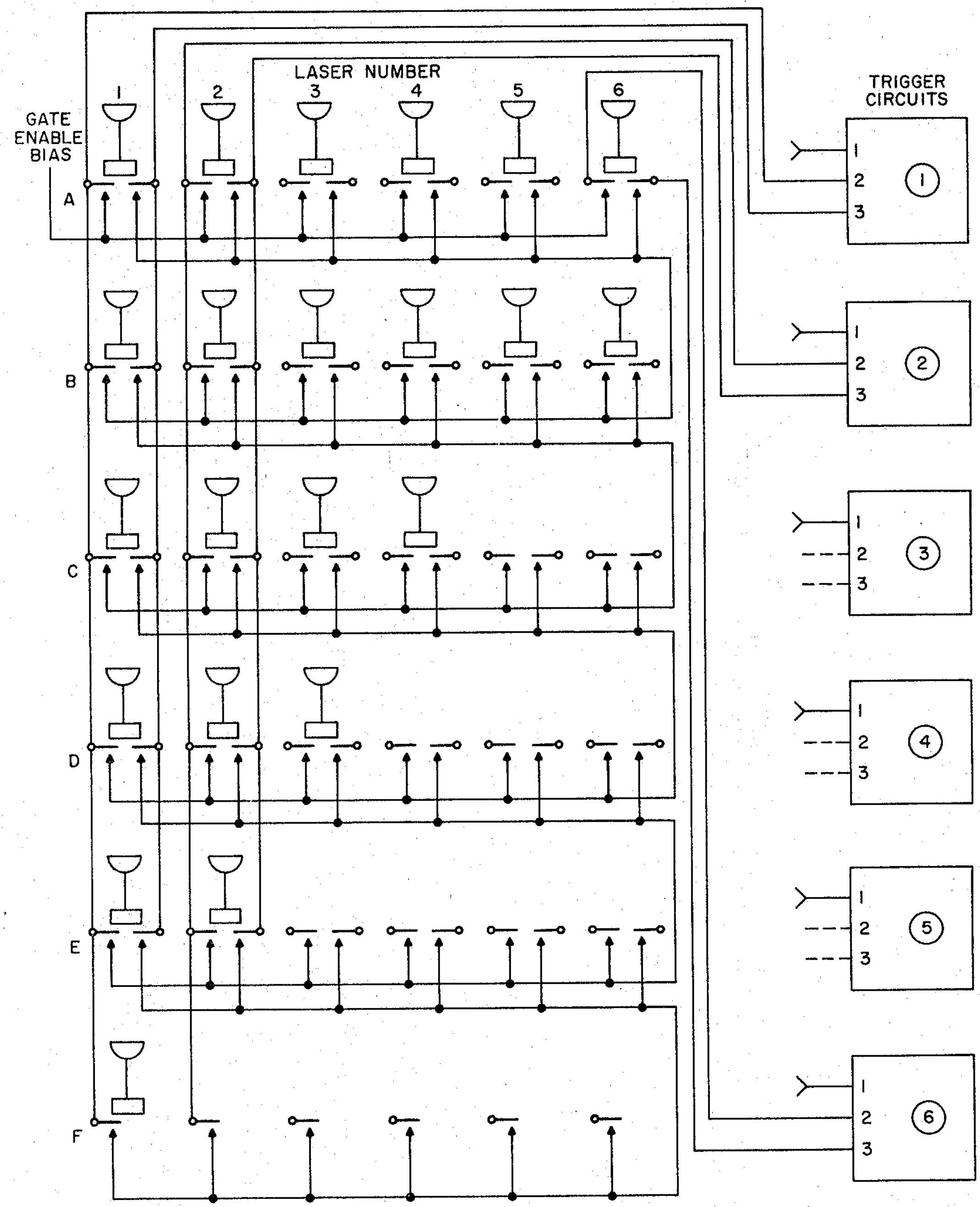
FIGURE 16 is a logic diagram teaching the sequencing of all the laser units in a desired order.

An even more flexible switching arrangement is shown in FIGURE 16 wherein all 6 lasers may be selectively fired, or any of the 6 lasers may be fired in any desired sequence. This action is accomplished utilizing the same trigger circuits indicated in FIGURE 15, the only significant difference being in the mechanical switching arrangement. FIGURE 16 is intended to represent 36 keys arranged in banks of 6. In order to initiate a desired sequence of firing, the laser which is desired to be fired first is selected by depressing the appropriately numbered key in bank A. The laser to fire next is selected by depressing the corresponding numbered key in bank B and so on until 6 buttons (or less) have been depressed. A mechanical latching arrangement may be included to lock out any numbered key depressed in any bank from being depressed in the other banks since a repetition of firing of the same laser may not be desired.

The operation of this switching method is similar to that previously described for FIGURE 15 in that the first trigger circuit to be fired is connected by the appropriate button in line A to a steady enabling bias by virtue of line 2, thus opening the AND gate for the next pulse from that trigger circuit's associated photodetector. The same switch connects line 3 from the first selected trigger circuit to a set of contacts on bank B. Upon depressing the next desired button in bank B, line 3 from the first trigger circuit is connected to line 2 of the next selected trigger circuit. Similarly, line 3 from the second selected trigger circuit is connected through to bank C and so on. This action results in all 6 of the trigger circuits being connected effectively in tandem such that each one is sequentially enabled by the gate generator in its immediately preceding trigger circuit only for the time of one revolution of the Fabry-Perot plate. This allows each unit to fire in sequence and in the selected order. Since the gate pulse generated by the various trigger circuits has a duration equal only to the time of one revolution of the Fabry-Perot plate, each laser will fire only once even though several revolutions may be necessary for the complete firing sequence.

It should now be apparent that my invention teaches the simultaneous accomplishment of several goals, viz., a grouping of lasers that are Q-switched with their outputs combined into a common beam, with not only their pulse repetition frequencies being combined, but so combined that they can be phased in a programmable manner, i.e., such that two or more lasers may be triggered in a pre-established relationship with outputs advantageously along the common axis.

Although I have described a prism located upon a rotational member, one of whose function is to reflect the output of the several lasers into a common beam by virtue of its internal reflection properties, it is to be understood that if desired, an inclined mirror could be disposed upon the rotational member to accomplish the same purpose. As other alternatives, it is possible to use other optical configurations on the rotational member, as for example, a pentaprism, with the normals to the parallel sides of the pentaprism oriented perpendicular to its axis of rotation.

Furthermore, the inclined reflecting member need not have its axis of rotation through the body of its material, which is to say, the inclined member may rotate about a central axis, describing a circle thereabout. In such cases, the output beams will not be along a common axis but will, however, be in a common direction, which, at large distances, will have the same effect. This type of arrangement thereby enables different prisms to rotate about the same axis without interference, with each prism being disposed on a different level of a multilevel central rotating member and relatable to a different group of laser units. For example, such groups of laser units may be disposed in parallel tiers or cone shaped tiers with the resulting output now consisting of the outputs of all the lasers of all the tiers. In this manner, very large numbers of lasers may be combined in their pulse repetition frequencies and output beam direction. The immediately foregoing is described at greater length in the co-pending patent application of Hammond and Parker entitled, Pulsed Laser Array filed Jan. 3, 1966, Ser. No. 519,828, and assigned to the assignee of the present invention.

Although I have shown and described a number of preferred embodiments herein, it is to be understood that the invention is not limited thereto except as required by the scope of the appended claims.

I claim:

1. An array of laser units capable of being operated in a Q-switching mode with the output beams thereof being disposed in a substantially common direction, said laser units each comprising a quality of laser material, reflecting means for forming in conjunction with each laser unit a portion of an optically resonant cavity in which said laser material is disposed, and pumping means for the generation of a population inversion in said materials, said laser units being disposed about an axis and arranged to utilize transiently a common Fabry-Perot plate for completing said optical resonant cavities, a rotating member utilizing a reflecting element rotating about said axis and inclined to said axis, said rotating member rotating through the positions in which said Fabry-Perot plate successively completes the optical resonant cavity of each laser unit in turn, such that those of the laser materials having existing population inversions due to previous pumping actions thereby undergo high intensity, short duration lasing action, said inclined reflecting element reflecting the output beams substantially parallel to the axis of rotation of said rotating member.

2. The array of laser units as defined in claim 1 in which said rotating member is a transparent prism.

3. The array of laser units as defined in claim 2 in which said Fabry-Perot plate is disposed upon the surface of said prism nearest the active laser material of said laser units.

4. The array of laser units as defined in claim 2 in which said Fabry-Perot plate is disposed upon a surface of said prism remote from the active laser material of said laser units.

5. The array of laser units as defined in claim 1 in which programmer means is provided for selectively bringing about a desired firing order of said laser units.

6. The array of laser units as defined in claim 1 in which the disposition of said laser units about said axis is adjustable, thereby enabling an adjustability of the relative time intervals between the firing of various selected combinations of laser units.

7. The array of laser units as defined in claim 1 in which means are provided for the controlling of the individual laser units in a programmable manner as to their selection and sequence of firing, thereby enabling said array to produce identifiable pulse intervals.

8. The array of laser units as defined in claim 1 in which synchronization means is provided for bringing about the activation of said pumping means at the proper lead time for achieving maxima of population inversion in said laser materials in synchronization with completion of respective optical resonant cavities, said synchronization means including at least one adjustable phase sensor for sensing the phase of said rotational member.

9. The array of laser units as defined in claim 8 in which said phase sensor includes a light source and photodetector, and means disposed upon said rotational member for periodically enabling illumination from said light source to strike said photodetector at the proper phase of rotation of said rotational member, said photodetector being caused by illumination from said light source to develop a signal that serves to time the activation of said pumping means.

10. An arrangement for sequentially Q-switching two or more laser units and providing an output therefrom that is substantially parallel to a given axis, said arrangement comprising at least two laser units, each laser unit comprising an incompleted portion of an optically resonant cavity, capable of being transiently completed, in which laser material is disposed, and pumping means for bringing about a population inversion in such laser material at the proper amount of time before the completion of a respective resonant cavity is brought about, each of said resonant cavities being transiently completed by a common Fabry-Perot plate, a rotational member disposed in a substantially central portion with respect to said laser units, an inclined reflector disposed upon said rotational member and being periodically brought into alignment with said laser material as a result of rotation of said rotational member, said rotational member being interrelated with said Fabry-Perot plate to the extent that at certain phases of rotation of said rotational member, said Fabry-Perot plate serves to complete the optical resonant cavity associated with each of said units, an optically resonant condition in a given laser unit occurring during a population inversion causing a substantial amount of stimulated emission to take place in such cavity and to cause an intense output of optical energy to be generated, said inclined reflector serving to redirect such output energy along said given axis.

11. The laser array as defined in claim 10 in which said pumping means means is controlled by a photodetector, and means disposed upon said rotational member for causing light to strike said photodetector at a predetermined adjustable phase angle with respect to the optical alignment of said Fabry-Perot plate.

12. The arrangement as defined in claim 10 in which programmer means is provided for selectively bringing about a desired firing choice and order of said laser units.

13. An arrangement for sequentially Q-switching two or more laser units and providing an output therefrom that is substantially parallel to a given axis, said arrangement comprising at least two laser units, each laser unit comprising a portion of an optically resonant cavity, capable of being transiently completed, in which laser material is disposed, and pumping means for bringing about a population inversion in such laser material at the proper amount of time before the completion of a respective resonant cavity is brought about, each said resonant cavities being transiently completed by a common Fabry-Perot plate, a rotational member disposed in a substantially central position with respect to said laser units, upon which member a transparent prism is disposed, said prism having an inclined internally reflecting face for redirecting light energy substantially along the axis of rotation of said rotating member, and having another surface serving as said Fabry-Perot plate that is periodically brought into proper orientation to complete said optically resonant cavity associated with each of said units, an optically resonant condition in a given laser unit occuring during a population inversion, causing stimulated emission to take place in such cavity and causing an intense output of optical energy to be generated, said reflecting face serving to redirect such output energy along said axis.

14. A laser array for producing a sequence of bursts of high light intensity comprising a plurality of laser units disposed about a given axis, each of said laser units utilizing a housing having an elliptically shaped interior in which a separate flash tube and quantity of active laser material are disposed, said flash tube and said laser material being disposed in essentially parallel relation on the foci of said elliptically shaped housing, with said laser material occupying a portion of an incomplete optical resonant cavity, a Fabry-Perot plate rotating at a high rate of speed upon said axis and disposed to transiently and sequentially complete said optical resonant cavities, means for optically pumping said laser units by the timed firing of said flash tubes, the flashing of a flash tube in each instance preceding the alignment of said rotary Fabry-Perot plate with the respective optical cavity so that alignment sufficient to bring about a resonant condition and stimulated emission is accomplished in a short time interval during the time that a substantial population inversion exists, thereby bringing about Q-switching, and resultant output of said laser units, and programmer means for selectively bringing about the desired choice and order of firing of said laser units.

15. The laser array as defined in claim 14 in which said rotating Fabry-Perot plate is a surface of a right angle prism, with the internal reflection off the hypotenuse surface of said prism causing light to be directed along an axis common to said laser array.

No references cited.

JEWELL H. PEDERSEN, *Primary Examiner*.

E. S. BAUER, *Assistant Examiner*.